US010431077B2

United States Patent
Martin et al.

(10) Patent No.: US 10,431,077 B2
(45) Date of Patent: Oct. 1, 2019

(54) MONITORING TRAFFIC FLOW (71) Applicant: OPTASENSE HOLDINGS LIMITED, Farnborough, Hampshire (GB)

(72) Inventors: Richard Martin, Farnborough (GB); Graham Bruce, Farnborough (GB)

(73) Assignee: OPTASENSE HOLDINGS LIMITED (GB)

( * ) Notice: Subject to any disclaimer, the term of this patent is extended or adjusted under 35 U.S.C. 154(b) by 0 days.

(21) Appl. No.: 15/771,503

(22) PCT Filed: Oct. 26, 2016

(86) PCT No.: PCT/GB2016/053330
§ 371 (c)(1),
(2) Date: Apr. 27, 2018

(87) PCT Pub. No.: WO2017/072505
PCT Pub. Date: May 4, 2017

(65) Prior Publication Data
US 2018/0342156 A1 Nov. 29, 2018

(30) Foreign Application Priority Data
Oct. 30, 2015 (GB) .................................. 1519202.4

(51) Int. Cl.
*G08G 1/07* (2006.01)
*G08G 1/08* (2006.01)
(Continued)

(52) U.S. Cl.
CPC ........... *G08G 1/0145* (2013.01); *G01H 9/004* (2013.01); *G08G 1/0116* (2013.01);
(Continued)

(58) Field of Classification Search
CPC .. G08G 1/0145; G08G 1/0129; G08G 1/0133; G08G 1/04; G08G 1/052; G08G 1/07; G01H 9/004
See application file for complete search history.

(56) References Cited

U.S. PATENT DOCUMENTS 5,194,847 A * 3/1993 Taylor .................... G01H 9/004
340/541
5,883,585 A * 3/1999 Akutsu .................... G08G 1/02
200/86 A (Continued)

FOREIGN PATENT DOCUMENTS

| CN | 201886628 U | 6/2011 |
| GB | 2513399 | 10/2014 |
| WO | WO 2013/114128 | 8/2013 |

Primary Examiner — Quang Pham
(74) Attorney, Agent, or Firm — McDonnell Boehnen Hulbert & Berghoff LLP (57) ABSTRACT

This application relates to apparatus and methods for traffic monitoring, especially for monitoring of road traffic flow using fiber optic distributed acoustic sensing. The method involves performing distributed acoustic sensing (DAS) using a suitable interrogator unit (103) to provide a measurement signal from each of a plurality of sensing portions of a first length of a sensing optical fiber (102), where the first length of the sensing optical fiber runs alongside a road (101) having a plurality of lanes. The measurement signals from the sensing portions are processed to detect vehicles (104) travelling on the road and to determine at least one detected traffic flow property. The method further involves using a traffic flow model to relate the detected flow property to a modelled flow property, where the traffic flow model is configured to model vehicle detections that will be missed by the distributed acoustic sensing i.e. an indication of vehicles present on the road but not detected by the DAS sensor.

21 Claims, 6 Drawing Sheets (51) Int. Cl.
*G08G 1/01* (2006.01)
*G01H 9/00* (2006.01)
*G08G 1/04* (2006.01)
*G08G 1/052* (2006.01)
*G08G 1/015* (2006.01)

(52) U.S. Cl.
CPC ......... *G08G 1/0129* (2013.01); *G08G 1/0133* (2013.01); *G08G 1/04* (2013.01); *G08G 1/052* (2013.01); *G08G 1/07* (2013.01); *G08G 1/015* (2013.01); *G08G 1/0112* (2013.01)

(56) References Cited

U.S. PATENT DOCUMENTS

| | | | |
|---|---|---|---|
| 9,170,149 B2 * | 10/2015 | Hartog | E21B 41/00 |
| 2004/0061628 A1 * | 4/2004 | Hill | E01F 11/00 |
| | | | 340/942 |
| 2004/0067004 A1 * | 4/2004 | Hill | G08G 1/02 |
| | | | 385/13 |
| 2008/0088846 A1 * | 4/2008 | Hayward | H04B 10/071 |
| | | | 356/446 |
| 2010/0158431 A1 * | 6/2010 | Huffman | G01H 9/004 |
| | | | 385/12 |
| 2012/0255362 A1 * | 10/2012 | Den Boer | G01H 9/004 |
| | | | 73/655 |
| 2015/0120174 A1 * | 4/2015 | Lewis | G08G 1/0112 |
| | | | 701/118 |
| 2016/0078760 A1 * | 3/2016 | Crickmore | G08G 1/04 |
| | | | 701/117 |
| 2016/0275788 A1 * | 9/2016 | Wu | G08G 1/04 |
| 2016/0364983 A1 * | 12/2016 | Downs | G08G 1/0108 |
| 2017/0091350 A1 * | 3/2017 | Bauer | G06F 17/5095 |
| 2017/0124863 A1 * | 5/2017 | Dumazert | G08G 1/0112 |

* cited by examiner

MONITORING TRAFFIC FLOW

FIELD OF THE INVENTION

This application relates to apparatus and methods for traffic monitoring, especially for monitoring of road traffic flow using distributed acoustic fibre optic sensing.

BACKGROUND OF THE INVENTION

There are various applications where it is desirable to monitor traffic flow along one or more roads. For instance there may be a desire to determine the amount of traffic on a given part of a road network and/or the flow of the traffic on that part of the network. Such information may be required for implementing adaptive traffic management techniques. For instance variable speed limits may be set according to the volume and flow of traffic on a given stretch of road. The operation of traffic lights or other signal controls to control access to a given section of road may be controlled based on knowledge of the traffic flow at various parts of the network. Contraflow systems or other lane controls may be activated or controlled based on such information.

Additionally or alternatively information about the volume and flow of traffic on various parts of the road network will be of use to traffic managers even if the network or parts thereof do not have active traffic management systems to provide data to allow modelling of any improvements to the general traffic management, such as permanent alterations in speed limits or changes to road markings or signage for example.

Collection of data about traffic flow before and after any changes will also be useful to determine how any changes have impacted traffic flow. Data on traffic flow will also be useful to planners for planning any upgrades or additions to the road network and may also be useful for incident management, for example in terms of opening and/or closing various diversion routes based on traffic patterns.

Also data on the volume of traffic travelling on sections of the road network may be of interest for those responsible for maintaining the network to allow decisions about regular maintenance based on likely wear.

Various types of road traffic monitoring systems exist.

Pressure or strain based sensors, for instance based on piezoelectric sensors or pneumatic hoses, may be laid, or embedded, across a carriageway and monitored to detect the weight of a vehicle crossing over the sensor. Such sensors will effectively act as axle counters and can be arranged to monitor volume of traffic and flow rate at a given point and also estimate generally the type of vehicle. Such sensors are useful and relatively simple but each lane of a multi-lane highway will require its own sensor and multiple sensors will be required at different points along a traffic network in order to be able to monitor traffic along the network. Sensor strips or hoses laid across the surface of a road will also be subject to relatively severe wear and tear requiring robust sensors and/or regular maintenance. Sensors embedded within a highway will be less exposed but will typically require more work to be installed and are much harder to access for repair or maintenance.

Inductive sensors can be used based on induction loops embedded within the carriageway. Passage of a vehicle produces eddy currents which can be detected. Induction loop traffic sensors are widely used in a range of applications and can provide information about traffic volume and flow and an estimate of vehicle type. Again however a separate induction loop must be provided for each lane of a multi-lane highway and multiple sensors along the road must be used to provide information about general traffic flow along the network, limiting overall resolution. The sensors are embedded within the carriageway with the associated costs and inconvenience of installation and difficulty of maintenance. Magnetic sensors using embedded magnetic detectors have also been proposed but have similar issues to inductive sensors.

Radar based sensors, for instance microwave radars, have also been used. The radar system may be mounted on an overhead gantry or bridge to transmit pulses of radiation along a lane of a carriageway. Returns from vehicles can be detected and the speed of the vehicle detected—either from a Doppler shift or by tracking the movement along the lane. Lidar based systems, e.g., IR based lidar, may use a similar approach or may simply scan for vehicles crossing under a scanned area. Such sensors may be relatively expensive however and need to be mounted with a good view of the road to be monitored which, as mentioned may require the presence of overhead structures—which may be not be available in various parts of the network.

Increasingly video processing is being used for traffic monitoring. Video images of the road network may be observed by control personnel to get a feel for the current traffic conditions to allow control decisions to be made but automatic image processing may also allow automatic detection of volume and flow of traffic. Image processing techniques such as pattern recognition and edge detection may be used to identify and track vehicles and potentially categorise the type of vehicle. In addition automatic number plate recognition may be applied to identify the number plate/licence plate of the vehicle. This can allow more sophisticated tracking of individual vehicles around the traffic network and, with access to a database of vehicle registrations, the type of vehicle can be identified from identifying the number plate. However again this requires multiple relatively high quality cameras positioned with good views of the roads to be monitored.

GPS based traffic monitoring has also been proposed, the idea being that at least some vehicles are equipped with a GPS tracker and a transmitter so as to transmit information about their location and speed to a central server. In theory the GPS equipment could be a requirement for every vehicle but in practice the system may possibly make use of any GPS device that the driver may possess, such as a navigational aid or smartphone, or provide dedicated GPS equipment to just a proportion of the vehicles that regularly travel on the road network of interest. With enough vehicles transmitting data it will be possible to monitor general flow rates of traffic on various parts of the network. However such methods are likely to be of limited use in low traffic volumes, may not provide enough accuracy to determine lane usage of a multi-lane road and may struggle in tunnels or mountainous regions where the GPS signals may be lost. This approach may also require vehicle owners to consent to being tracked and the data may be collected by a different entity to the one managing the road network.

SUMMARY OF THE INVENTION

Embodiments of the present invention relate to traffic monitoring systems, especially road traffic monitoring systems, that at least mitigate at least some of the above mentioned disadvantages.

Thus according to the present invention there is provided a method comprising:

performing distributed acoustic sensing to provide a measurement signal from each of a plurality of sensing portions of a first length of a sensing optical fibre, wherein the first length of the sensing optical fibre runs alongside a road having a plurality of lanes;

processing the measurement signals from said sensing portions to detect vehicles travelling on the road and determine at least one detected traffic flow property; and using a traffic flow model to relate the detected flow property to a modelled flow property, wherein the traffic flow model is configured to model vehicle detections that will be missed by the distributed acoustic sensing.

The method of this aspect of the present invention thus uses a traffic flow model that takes into account detections that would be expected to be missed by a DAS sensor. As will be described in more detail below by taking into account detections that it may be expected would be missed by a DAS sensor the method of the present disclosure can determine how well the DAS sensor installation is operating and/or correct for the missed detections to provide an estimate of true flow.

In some embodiments the traffic flow model may comprise an observation probability, the observation probability being the likelihood that detection of a vehicle in one lane will or will not be acoustically masked by a vehicle in a different lane which is closer to the sensing optical fibre. The observation probability may be determined based on traffic flow conditions. In some examples the observation probability for a lane may be determined based on an average vehicle spacing in lanes closer to the sensing optical fibre, wherein the average vehicle spacing in a lane is determined according to a first function relating average speed in said lane to total traffic flow and a second function relating traffic lane in said lane to lane to total traffic flow. The first and second functions may be based on historic flow data.

In some instances the observation probability for a lane may additionally or alternatively be determined based on a masking window associated with a vehicles in a lane to the sensing optical fibre. Different vehicles may be classified into different categories, with each category being associated with a masking window of different size. In which case the traffic flow model may determine, for at least one lane, a proportion of vehicles of each category.

In some instances when the traffic flow model comprises a detection probability, the detection probability may comprise the likelihood that a vehicle in a given lane which is not acoustically masked will or will not be detected by the distributed acoustic sensing. The detection probability may be based on test data obtained by driving a test vehicle in the along the relevant section of road in the relevant lane at times of low traffic volume.

The at least one detected traffic flow property may comprises a total detected flow value. Additionally or alternatively the at least one detected traffic flow property may comprise a detected average vehicle speed and/or a detected spread of vehicle speeds.

In some embodiments the method may further comprise monitoring traffic flow using a second different traffic monitoring system. In which case using the traffic flow model to relate the detected flow property to a modelled flow property may comprise deriving a predicted value of the flow property as the modelled flow property based on the monitored traffic flow and the traffic flow model; and comparing the predicted and detected flow property.

In other words the DAS monitoring system may be used alongside a second different traffic monitoring system, which may for instance be one that only monitors the road at one or more locations but which does not suffer from the masking problems of the DAS monitoring system. The DAS monitoring system is used to monitor traffic flow and provide a detected flow property, e.g. an indication of the detected traffic flow volume. Based on the traffic flow detected by the second traffic monitoring system and the traffic flow model for DAS sensing an indication of the predicted response of the DAS traffic monitoring system can be determined. The predicted response can be compared to the actual response, e.g. a part of an assessment or calibration of the performance of the DAS traffic monitoring system and/or the traffic flow model.

The second different traffic monitoring system may comprise a video based traffic monitoring system.

The second different traffic monitoring system may be deployed only temporarily, e.g. during a calibration period of the DAS sensor.

In some embodiments one or more parameters of the traffic flow model may be adjusted based on the comparison, i.e. the comparison of the actual and predicted performance.

In some embodiments the method may use the traffic flow model to provide an estimate of a true value of the flow property as the modelled flow property based on the detected flow property, wherein the estimate of the true value of the flow property compensates for missed detections. In other words the DAS traffic monitoring system may determine a detected flow property, e.g. a detected traffic flow volume, and the model may then effectively be used to translate the detected flow property into an estimate of a true flow value. The model may thus account for the likely missed detections under current flow conditions to provide an estimate of the true flow.

The method may therefore comprise estimating flow conditions based on at least one of: a detected traffic flow value, a detected average traffic speed, a spread of detected traffic speed, wherein the traffic flow model derives the estimate of a true value of the flow property based on the detected flow property and the estimated flow conditions.

Aspects of the invention also relate to apparatus for monitoring traffic flow. Thus according to another aspect there is provided an apparatus for determining traffic flow, the apparatus being configured to:

receive a first data set corresponding to distributed acoustic sensing measurement signals from each of a plurality of sensing portions of a first length of a sensing optical fibre, wherein the first length of the sensing optical fibre runs alongside a road having a plurality of lanes;

process the measurement signals from said sensing portions to detect vehicles travelling on the road and determine at least one detected traffic flow property; and use a traffic flow model to relate the detected flow property to a modelled flow property, wherein the traffic flow model is configured to model vehicle detections that will be missed by the distributed acoustic sensing.

The apparatus is thus responsive to a suitable DAS sensor. The apparatus may be arranged to process the data set to provide the method as discussed in any of the variants discussed above.

The apparatus may further comprise the DAS sensor. Thus the apparatus may comprise the first length of sensing optical fibre and a distributed acoustic sensing interrogator unit configured to interrogate the first length of sensing optical fibre to obtain set first data set. The apparatus may be part of a traffic management system. Such a traffic management system may comprise an apparatus for determining traffic flow as described, which is configured to provide an estimate of traffic flow, and also a controller for generating a control signal for controlling at least one road signal based on said estimate of traffic flow.

The techniques discussed above may be used for assessing or calibrating a DAS traffic monitoring system. Thus in another aspect there is provided a method of assessing a distributed acoustic sensor traffic monitoring system having a sensing optical fibre deployed to run alongside a first section of road with multiple lanes, the method comprising:

monitoring traffic flow over the first section of road using the distributed acoustic sensor traffic monitoring system to provide a DAS detection value;

monitoring traffic flow over at least part of the first section of road using a second different type of traffic monitoring system to provide an indication of vehicle flow;

applying a traffic flow model to the indication of vehicle flow to provide an estimate of the expected DAS detection value; and wherein the traffic flow model is configured to model vehicle detections that will be missed by the distributed acoustic sensor.

The method of this aspect may be implemented in any of the suitable variants described above in relation to the first aspect.

The techniques discussed above may be used for correcting or improving the outputs of a DAS traffic monitoring system. Thus in another aspect there is provided a method of monitoring traffic comprising:

using a distributed acoustic sensor traffic monitoring system to provide a detected flow value; and applying a traffic flow model to the detected flow value to provide an estimate of a true flow value;

wherein the traffic flow model is configured to model vehicle detections that will be missed by the distributed acoustic sensor.

The method of this aspect may be implemented in any of the suitable variants described above in relation to the first aspect.

The method is also applicable to data acquired remotely by a suitable DAS sensor. Thus in a yet further aspect there is provided a method comprising:

receiving a first data set corresponding to distributed acoustic sensing measurement signals from each of a plurality of sensing portions of a first length of a sensing optical fibre obtained by, wherein the first length of the sensing optical fibre runs alongside a road having a plurality of lanes;

processing the measurement signals from said sensing portions to detect vehicles travelling on the road and determine at least one detected traffic flow property; and using a traffic flow model to relate the detected flow property to a modelled flow property, wherein the traffic flow model is configured to model vehicle detections that will be missed by the distributed acoustic sensing.

DESCRIPTION OF THE DRAWINGS

The invention will now be described by way of example only with respect to the following drawings, of which.

DESCRIPTION OF THE INVENTION

Embodiments of the present invention relate to monitoring traffic flow, and in particular to providing an indication of total traffic flow on a section of road, especially a road with multiple lanes, using distributed acoustic sensing on a sensing fibre deployed to run along the path of the road, e.g. generally parallel to the road.

Distributed acoustic sensing (DAS) is a known type of sensing where an optical fibre is deployed as a sensing fibre and repeatedly interrogated with electromagnetic radiation to provide sensing of acoustic activity along its length. Typically one or more input pulses of radiation are launched into the optical fibre. By analysing the radiation backscattered from within the fibre, the fibre can effectively be divided into a plurality of discrete sensing portions which may be (but do not have to be) contiguous. Within each discrete sensing portion mechanical disturbances of the fibre, for instance, strains due to incident acoustic waves, cause a variation in the properties of the radiation which is backscattered from that portion. This variation can be detected and analysed and used to give a measure of the intensity of disturbance of the fibre at that sensing portion. Thus the DAS sensor effectively acts as a linear sensing array of acoustic sensing portions of optical fibre. The length of the sensing portions of fibre is determined by the characteristics of the interrogating radiation and the processing applied to the backscatter signals but typically sensing portions of the order of a few meters to a few tens of meters or so may be used.

As used in this specification the term "distributed acoustic sensing" or "DAS" will be taken to mean sensing by optically interrogating an optical fibre to provide a plurality of discrete acoustic sensing portions distributed longitudinally along the fibre and the term "distributed acoustic sensor" shall be interpreted accordingly. The term "acoustic" shall mean any type of pressure wave or mechanical disturbance that may result in a change of strain on an optical fibre and for the avoidance of doubt the term acoustic be taken to include ultrasonic and subsonic waves as well as seismic waves.

DAS can be performed on sensing optical fibres of up to the order of 40 km or so or more in length. For traffic monitoring the sensing fibre can be deployed to run generally along the path of a road of interest, for instance being deployed alongside the road. As the sensing fibre may be standard optical fibre, such as single mode fibre that is routinely used for telecommunications, the optical fibre is inexpensive and can installed in a relatively permanent fashion. The sensing fibre may be buried or otherwise deployed alongside the road to be monitored and is not subject to the wear and tear of traffic movement over the fibre in use and installation and maintenance does not require access to the road itself. As the sensing function relies on launching radiation into a first end of the sensing fibre and also detecting radiation which is backscattered to that first end and thus an interrogator unit is only needed at one end of the fibre and no power or data link is required along the length of the fibre, just at the interrogator unit. DAS thus has several advantages for traffic sensing.

In some embodiments the sensing fibre may be buried alongside the path of the road so that the sensing fibre is generally (locally) parallel to the road being monitored. This can effectively provide a linear array of acoustic sensors along a significant length of road. Movement of vehicles on the roads generate acoustic signals/vibrations that propagate to the sensing fibre and which can be detected by the DAS sensor. As the DAS sensor can provide a plurality of contiguous sensing portions along the length of the sensing fibre that can allow vehicle movement along the monitored section of road to be tracked.

Such a DAS sensor can be used to determine average traffic speed measurements and provide journey time estimation and also provide queue and congestion detection.

It has been appreciated however that for roads with multiple lanes any practical DAS system where the sensing fibre runs alongside the road may have difficulty in distinctly detecting vehicle travelling in the lanes further away from the DAS sensing fibre, especially at higher traffic flows.

Some embodiments of the invention thus relate to the testing and/or calibration of a DAS traffic sensor system to provide an indication of the performance of the system and possibly allow aspects of the system to be tuned to improve performance. In such embodiments the actual system performance may be compared with a modelled performance based on a traffic flow model for the relevant section of road, i.e. the predicted performance during the observed traffic conditions.

Additionally or alternatively in some embodiments the DAS traffic sensor may provide a traffic flow value, i.e. an estimate of traffic flow, by determining a detected flow value, e.g. an actual measured count of the number of vehicles detected passing in a certain time frame, and then use a traffic flow model for the relevant section of road to provide an estimated true flow value based on the detected count.

As will be described in more detail later the traffic flow model includes an indication of likely missed detections based on traffic conditions, i.e. an indication of vehicles present on the road but not detected by the DAS sensor.

Figure 1:
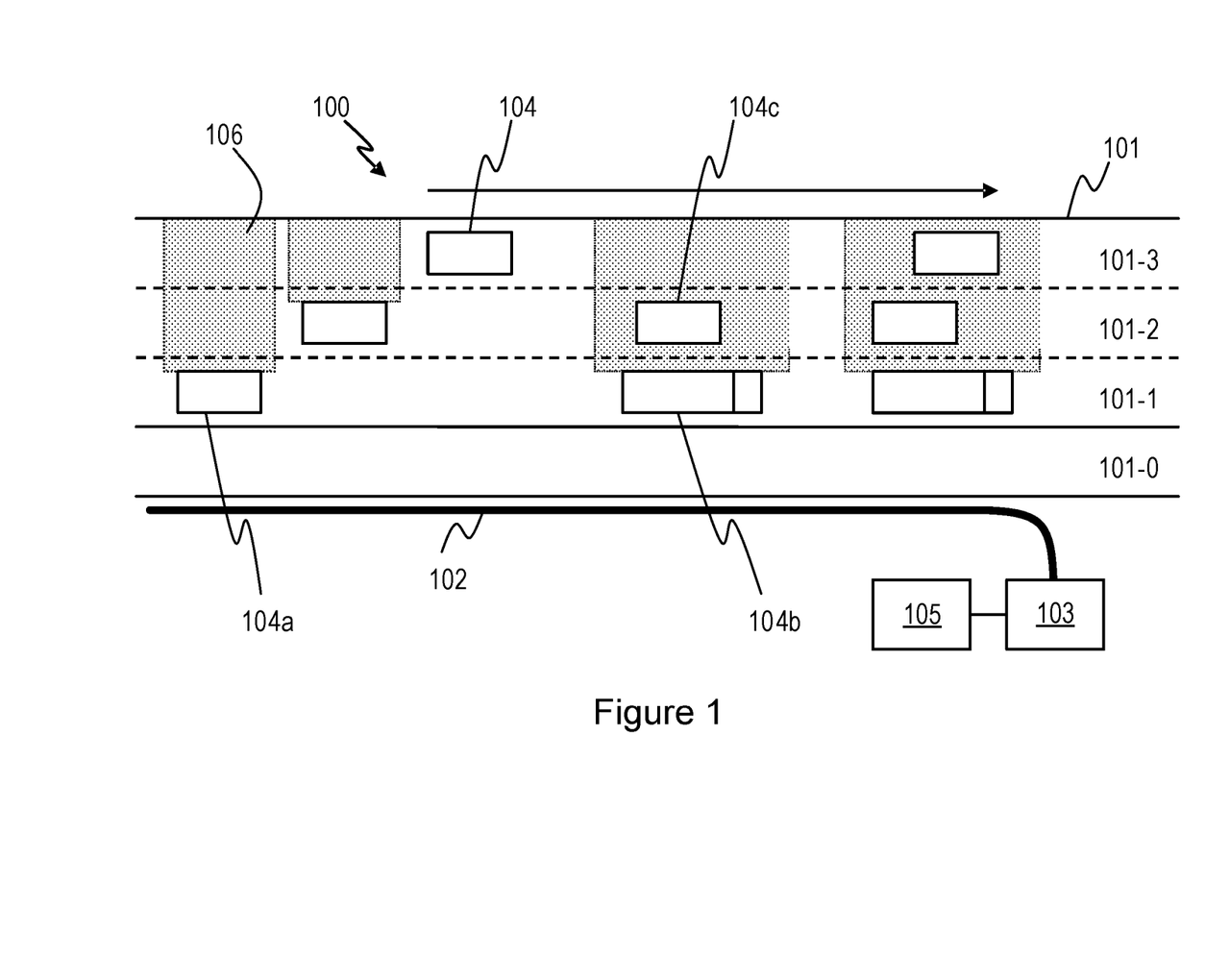
FIG. 1 illustrates a section of a multi-lane road which is monitored by a DAS system.

FIG. 1 illustrates a road traffic monitoring system 100 according to an embodiment of the invention. FIG. 1 illustrates a section of road 101 where it is wished to monitor traffic flow. The section of road 101 illustrated in FIG. 1 is has a plurality of lanes for vehicle travel in the same direction (indicated generally by the arrow at the top of the figure). In this example there are three lanes of the main carriageway, 101-1, 101-2 and 101-3 and also an emergency lane or area, e.g. a hard shoulder 101-0.

Deployed alongside the road 101 is a sensing optical fibre 102 which is coupled at one end to a DAS interrogator unit 103. The DAS interrogator unit 103, an example of which will be described in more detail below, interrogates the sensing optic fibre with optical radiation and detects and processes the radiation backscattered from within the sensing fibre to determine a measurement signal for each of a plurality of sensing portions of the sensing fibre indicative of environmental disturbances acting on that sensing portion of optical fibre, in particular dynamic strains such as resulting from incident pressure/acoustic waves or other induced vibrations.

The path of the sensing fibre may generally follow the path of the road, for instance the sensing fibre may be substantially locally parallel to the path of the road. However it will be appreciated that in some embodiments at least part of the sensing fibre may be deployed so as to deviate from being parallel to the road. To account for any variation of the sensing fibre from being locally parallel to the road, the individual channels of the DAS sensor, i.e. the sensing portions may be mapped to the closest point on the monitored carriageway, thereby providing a scale which is linear with respect to the traffic movement.

In the example illustrated in FIG. 1 the sensing fibre is deployed to run alongside the road 101 and thus is outside the area of any of the normal vehicular lanes 101-1-101-3. In this embodiment the sensing fibre is also deployed outside the area of the emergency lane 101-0. In this way the sensing fibre does not need to be formed within the material of the road 101 and is not subject to significant stresses due to the passage of traffic over the road surface. Access to the sensing fibre, e.g. for repair or maintenance, will thus not require access to the road surface itself and likewise any maintenance of the road surface need not be concerned about the presence of a sensing fibre. The sensing fibre, which will typically be part of a fibre optic cable structure, may thus be deployed within the vicinity of the road and may be buried relatively shallowly alongside the road, e.g. along a roadside verge or the like. Burying the sensing fibre may help protect it from damage and from environmental effects such as wind, rain etc. as well as providing good acoustic coupling via the ground.

It will be appreciated however that at least part of the sensing fibre may in some instance be buried or embedded within the emergency lane 101-0 if present. It will also be appreciated that the sensing fibre 102 could be deployed on the other side of the road, i.e. on the opposite side of the road to any emergency lane 101-0.

Figure 2:
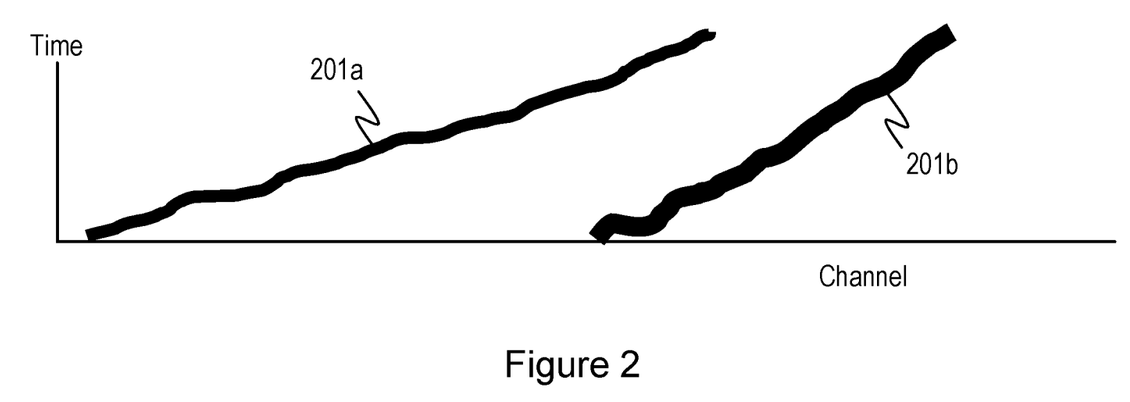
FIG. 2 illustrates the principles of the response from a DAS sensor to a vehicle travelling along a road.

Vehicles 104 will generally travel along the road in the marked lanes (unless changing lanes). As mentioned above the noise/vibration created by travel of the vehicle along the road will generate acoustic signals that can be detected by the DAS sensor formed by sensing fibre 102 and interrogator unit 103. For example consider a first vehicle 104a travelling along the road. This will create a detectable noise signature above the ambient background noise in the vicinity of the vehicle. As the vehicle moves along the road the noise signature will track along the sensing fibre as illustrated in FIG. 2. FIG. 2 illustrates the simplified principle of a waterfall type plot where the acoustic intensity is plotted for each of a plurality of sensing channels i.e. sensing portions of the sensing fibre at different locations, over time. Plot 201a indicates that a relatively intense acoustic signal may be detected from vehicle 104a which tracks along the acoustic channels as the vehicle travels along the road. The rate of progression of the acoustic signal across the various channels will depend on the deployment of the sensing fibre compared to the road and the vehicle speed. Assuming that the sensing fibre generally runs parallel to the road as illustrated in FIG. 1 the vehicle speed could be determined from the gradient of plot 201a. As noted above however in general the channels of the DAS sensor may be mapped to the locally closest point on the road. Thus the width and/or spacing of the channels of the sensor may vary but the mapped scale in linear with respect to propagation of a vehicle. Thus the speed of the vehicle can be calculated from the gradient of the vehicle track along the re-mapped scale of DAS channels.

Other vehicles travelling on the road may likewise give rise to similar acoustic signals. For instance vehicle 104*b*, which may be ahead of vehicle 104*a* on the road may also generate a detectable acoustic signal in other sensing portion, illustrated by plot 201*b*. It can be seen from FIG. 2 that the gradient of plot 201*b* corresponding to vehicle 104*b* is steeper than plot 201*a* from vehicle 201*a* indicating that vehicle 104*b* is moving slower than vehicle 104*a*.

A processor 105 may thus identify acoustic disturbances that track along several sensing portions of the sensing fibre 102 in this way as being indicative of a vehicle travelling along the road. The processor may therefore employ a tracking algorithm to identify such tracks as a detected vehicle. It can therefore be seen that by detecting the acoustic signals associated with vehicles moving on the road it is possible to detect the presence of vehicle. It is also possible by monitoring the track of the vehicles to determine the speed of the vehicles and thus provide an indication of average speed of vehicles on the road and hence estimates of journey times. It will also be appreciated that the acoustic signal from a large vehicle will also typically affect more contiguous sensing portions of the sensing fibre than that from a small vehicle. As illustrated in FIG. 2 the acoustic plot 201*a* from vehicle 104*a* which may be a car may have a smaller width that that of acoustic plot 201*b* from vehicle 104*b* which may be a heavy goods vehicle. It may therefore also be possible to categorise the type of vehicle in this way.

If a distinct acoustic signal could be identified for each vehicle travelling on the road then a total count of the number of vehicles travelling on a given section of road could be determined and a flow value based on the detected count per unit time determined, e.g. vehicles per minute say.

It has been appreciated however that detecting a distinct acoustic signal from every vehicle using such a DAS system may not be practical for a road with multiple lanes as vehicle flow increases.

First, in a real world system, the extent to which a signal from a given vehicle travelling along the road may be detectable, above the background noise level, at a sensing portion of fibre may depend on a number of issues.

The fibre sensitivity to traffic activity at each location may for instance be dependent on the properties of the sensing fibre itself, the acoustic coupling between the fibre and the moving traffic and acoustic signal in the ground produced by the traffic.

The relevant properties of the sensing fibre may include the rate of signal loss in the fibre (i.e. fibre quality), any significant reflective or non-reflective events caused by features such as poor fibre joints and the fibre length. Generally good quality sensing fibre with no splices or the like may be used and the length of the sensing fibre may be controlled to ensure acceptable sensing performance so fibre performance issues may be minimal.

However the acoustic coupling between the fibre and the moving traffic may depend on the burial conditions of the fibre (e.g. in ducting, direct buried, slot cut, etc.), the fibre location (e.g. central reservation or side of road) and corresponding offset distance between the fibre and each lane of traffic and the medium through which the acoustic signal from the traffic passes, including any boundaries between different ground media.

The acoustic signal in the ground produced by the traffic may be dependent on the size and type of vehicles, the general traffic volume and average vehicle speed and also factors such as the road surface and any road structures such as bridges or tunnels.

In general, in low traffic flow conditions, where the background noise is relatively low, the main factors that influence the signal induced in a given sensing portion due to passage of a vehicle may depend principally on the type of vehicle, e.g. whether a car or a heavy goods vehicle, and which lane the vehicle is travelling in, i.e. the offset distance from the fibre. However at different locations any variation in road surface, or burial conditions of the fibre may lead to a sensitivity variation between different sensing portions.

The second reason that a true total count of vehicles on the road may not realistically be expected from a DAS system using a sensing fibre running generally alongside, e.g. parallel to, a multi-lane road is that vehicles closer to the fibre may acoustically mask vehicles at the same distance along the fibre. Referring back to FIG. 1 it can be seen that vehicle 104*a* is travelling along the normal vehicle lane 101-1 which is closest to the sensing fibre 102. This will effectively acoustically mask an area 106 of lanes 101-2 and 101-3. Any acoustic signals generated in this masked region 106 and detected by the sensing fibre 102 would not be distinct from the acoustic signals generated by vehicle 104*a*. Thus based purely on the acoustic signals detected by the DAS sensor it would not be possible to determine whether plot 201*a* for instance is caused by a single vehicle or by two vehicles travelling generally side by side. FIG. 1 illustrates for example that vehicle 104*b* may be masking any distinct signal from vehicle 104*c*.

The extent to which this masking effect occurs will depend on the type of vehicle. It will be clear that the masked area due to a car, say vehicle 104*a*, may be smaller than that due to a heavy goods vehicle 104*b*. The masking effect will also depend on what lane the masking vehicle is travelling in. It can be seen that a vehicle travelling in lane 101-1 may possibly be masking a vehicle in lane 101-2 and/or a vehicle in lane 101-3. However a vehicle travelling in lane 101-2 (which is not itself masked) may, for this three lane road example, only mask a vehicle in lane 101-3 and a vehicle travelling in lane 101-3 (which is not itself masked) provides no masking on its own carriageway, but may still mask signals from the opposite carriageway.

Embodiments of the present invention thus make use of a traffic flow model that models the extent to which a DAS sensing with a sensing fibre running alongside a multiple lane road should detect vehicles travelling on the lanes of the road, for various flow conditions.

In some embodiments such a traffic flow model may be used to assess the performance of a DAS sensor against the modelled performance which may allow for tuning of the sensor. Additionally or alternatively such a traffic flow model may be used together with the actual detected data from the DAS sensor to provide at least one estimate of a true flow property, such as estimate true total flow value, e.g. an estimated true count of vehicles in a unit time.

The model may be based on two propositions:
1) a certain proportion of the vehicles in each lane will be acoustically masked from the DAS sensor by other vehicles on the road, preventing their detection. This will depend on the position of the fibre, the type of vehicles on the road (e.g. number of HGVs) and the density of the traffic in each lane; and
2) for the vehicles in each lane which are not acoustically masked, each will have a certain probability that they will be detected by the DAS sensor. This probability is dependent on the strength of the acoustic signal received by the fibre, which is influenced by the size of the vehicles, the speed they are travelling, the acoustic coupling between the fibre and the point of contact with the road, and any other sources of noise.

The method may therefore uses a traffic model that is appropriate for the section of road being monitored to relate a detected flow value, $F_D$ (e.g. the number of detected vehicles per unit time) to the actual flow in each lane.

The relationship between the detected flow value $F_D$ which would be expected to be detected by a DAS sensor and the actual flow in each lane can be determined according to:

$$F_D = \Sigma_{L=1}^{n} PD_L \times Obs_L \times F_L \qquad \text{Eqn. (1)}$$

where $PD_L$ is the probability of detection of a vehicle in lane L, $Obs_L$ is the fraction of vehicles in lane L that are observable, i.e. not masked and $F_L$ is the actual traffic flow (number of vehicles per unit time) in lane L and where n is the total number of lanes.

The probability of detection of a vehicle in a given lane, $PD_L$, will, as mentioned above, typically depend on the type of vehicle and also the acoustic coupling to the sensing fibre at the part of the road of interest as well as on the general traffic flow. The probability of detection of a vehicle in a given lane may therefore be different for different vehicle types.

In some embodiments the probability of detection of a vehicle may be based on a sensitivity profile for the sensor which may be obtained by testing the DAS sensor using at least one vehicle type. The testing process may involve one or more test runs where a known type of test vehicle is driven along the section of road which is being monitored by DAS at a known time so that the detected DAS response signal can be processed in light of the known test vehicle passage to determine the sensitivity of the DAS sensor. For instance a test run may be performed at time of low usage of the road, e.g. at night or when the road is closed for maintenance or some other reason, and the calibration run may involve driving the test vehicle in a defined lane at a defined speed as far as possible. Multiple test runs, which may involve different vehicle types, different speeds and/or travel in different lanes may be performed. The test vehicle may be tracked by some position measurement system, e.g. a GPS tracker or the like, so that the position of the test vehicle on the section of road over time can be correlated with the acoustic signals detected by DAS.

Figure 3:
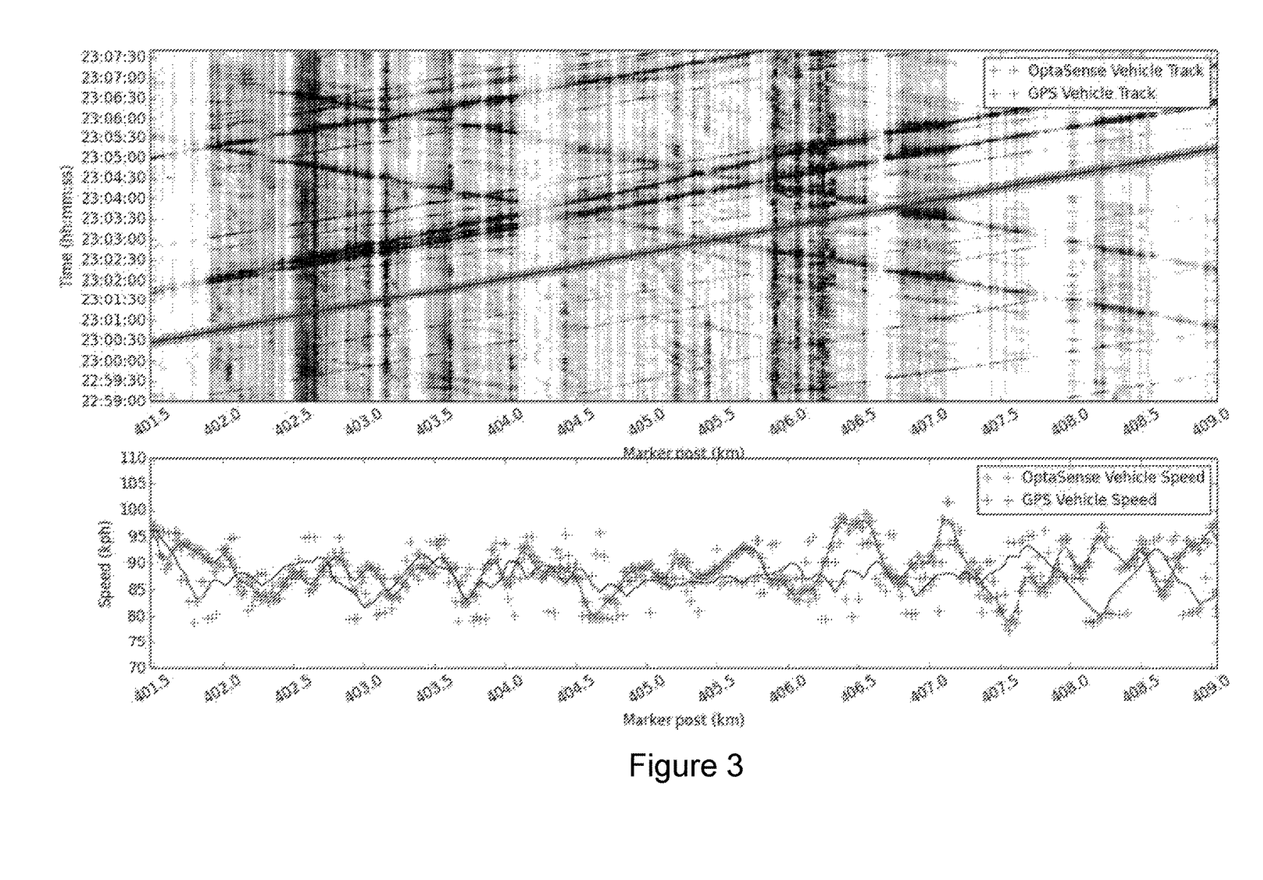
FIG. 3 illustrates DAS data obtained from a test vehicle travelling along a monitored section of road.

FIG. 3 illustrates test data obtained by driving a test vehicle down a section of road monitored with DAS. In this instance the test vehicle was fitted with a GPS tracker and driven at a substantially constant speed of a multi lane road. The position information from the GPS tracker was used to identify the relevant acoustic signal in the DAS sensor response to the test vehicle and determine how clearly the acoustic signal from such a test run could be identified. From such data an indicative signal-to-noise-ratio (SNR) was determined for the response to the test vehicle.

As mentioned a plurality of test runs may be performed to provide date regarding sensitivity in different lanes, at different speeds and/or for different vehicles types. Such a test run may also be performed at times of higher volume traffic, in which case the test vehicle may also be provided with apparatus for determining when the test vehicle was likely to be acoustically masked by vehicles on other lanes, for instance a time stamped video of any traffic in the lane(s) between the test vehicle and the sensing fibre could be recorded and used to identify times where the test vehicle may have been acoustically masked. The DAS data obtained during the test run could be analysed to determine, for periods when the test vehicle should have been observable, whether the test vehicle is actually clearly observable in the acoustic response from the DAS sensor and determine an SNR.

From such sensitivity measurements an indication of the probability of detection could be determined which may be a probability of detection of a vehicle for the relevant lane of a given section of road. Different probabilities of detection could be determined for different vehicle types and/or different flow conditions.

In one example a series of test runs were performed over at least parts of given stretch of road of the order of 20 km or so in length. The same test vehicle, which was an average sized estate car in this instance, was used in each calibration run but travelling in various different lanes and at different speeds in the test runs. In each case the total distance travelled by the test vehicle in the correct lane and at substantially the correct speed over the section of road was determined and the DAS output analysed to determine the amount of this valid test distance where the test vehicle was correctly tracked by the DAS sensor. This was used to generate a series of values of the percentage of the valid test distance travelled which was correctly tracked. The values for the various lanes were then aggregated to give a general detection probability for the test vehicle in each lane. In this particular set of tests the probability of detection for lane 1 (i.e. lane 101-1 in FIG. 1) was around 86% with detection probabilities for lanes 2 and 3 of around 81% and 65% respectively.

Additionally or alternatively the probability of detection may be determined by running the DAS sensor to count the number of vehicles of each type passing a particular location in each lane during low flow conditions, when the masking effects will be negligible, and also separately counting the number of vehicles by some other counting means, which may be used temporarily during a DAS testing phase, for instance a video based vehicle counter. This would enable a determination of the percentage of each type of vehicle in each lane which is successfully detected by the DAS sensor.

As mentioned the other reason that a vehicle may not be detected may be because a distinct signal from the vehicle is effectively masked. The fraction of vehicles in lane L that are observable, $Obs_L$, i.e. not masked, will typically depend on the traffic conditions.

For instance at conditions of low flow a majority of vehicles may travel in lane 101-1 and the proportion of time that any vehicles travelling in the other lanes are masked may be relatively low. As traffic flow builds the number of vehicles in the other lanes may increase and the proportion of time that vehicles in lanes 101-2 or 101-3 are masked may increase.

The traffic flow model may thus be used to estimate the percentage of vehicles which are masked during specified traffic conditions.

Figure 4A:
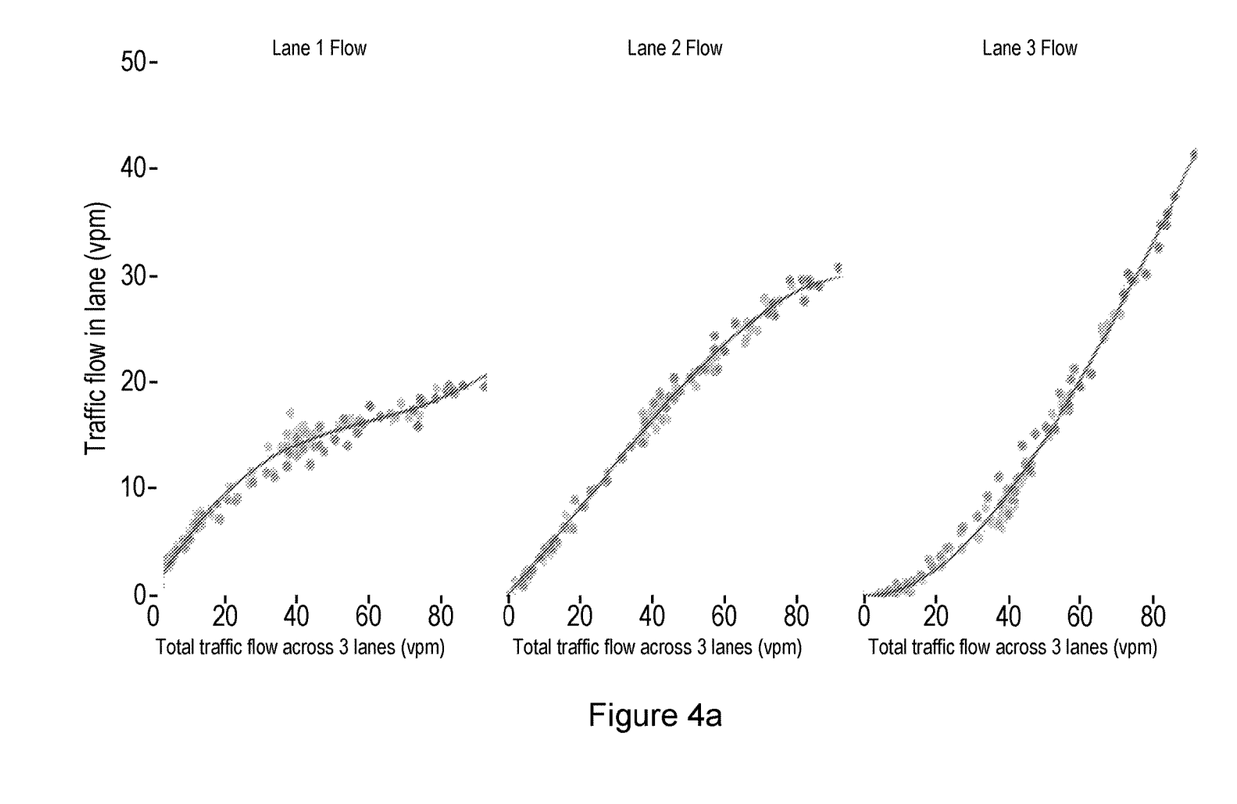
FIGS. 4a and 4b illustrate how traffic flow and average speed may vary between lanes of a multi-lane road with overall traffic volume.
Figure 4B:
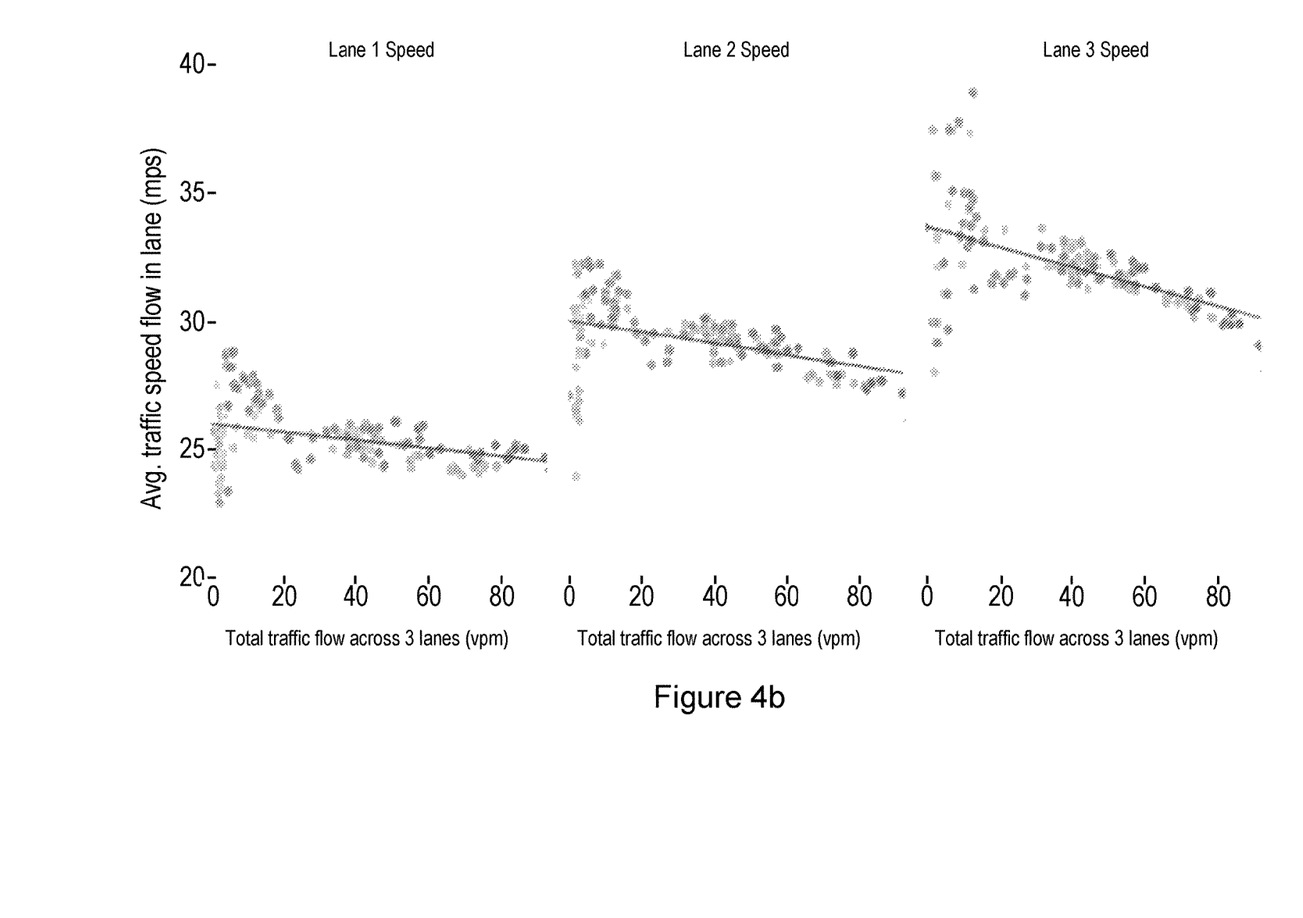

The traffic flow model for determining masking may be based on a number of model parameters. In some embodiments the model parameters may include at least some of:
 a) the distribution of vehicles in each lane of the relevant section of road during different traffic conditions. This distribution may be measured by collecting traffic flow data over a sufficiently large range of conditions (e.g. for a certain period of time, say 24 hours at least), either from existing or temporary flow sensors. FIG. 4a illustrates flow data obtained from a given section of road showing the flow (vehicles per minute) in each lane of a three lane road and how it varies with overall flow. It can be seen that there is a generally well established relationship between overall flow and the flow in each individual lane; and b) the average speed of the vehicles in each lane during different traffic flow conditions. Again this may be determined by monitoring the relevant section of road. FIG. 4b illustrates some data obtained by measuring, using in-lane traffic sensor, that indicates how the average speed varies by lane and with overall flow and again it can be seen that there is a fairly clear relationship between average speed and total flow, although at very low flow rates there may be more variability.

The average speed of vehicles in each lane $V_L$ may be used together with an indication of the flow in that lane $F_L$ to calculate the average density or spacing $S_L$ of the traffic in each lane, e.g. by:

$$S_L = V_L / F_L \qquad \text{Eqn. (2)}$$

The model may also take into account the approximate proportion of vehicles of each type in each lane during a range of traffic conditions and an estimated size of the acoustic masking window for each vehicle type. The size of the masking window could, for instance, be determined using SNR analysis of recorded DAS sensor data.

As mentioned at least some of the relevant parameters for the traffic flow model may be determined by monitoring the relevant section of road during a DAS sensor calibration phase, possibly using some other type of traffic flow measuring system for some period of time. In some instances however at least some of the parameters may have been based on knowledge of typical flow patterns for sections of road with similar properties, i.e. proximity to entry or exit junctions/spacing of junctions/degree of road bending/inclination etc.

The traffic flow model may thus rely on some assumptions about the behaviour of the traffic. The assumptions may include at some of:

1) the distribution of traffic in each lane is a direct function of the total traffic flow on the carriageway at that location, e.g. the relationship illustrated in FIG. 4a holds true. Based on various sources of collected data this relationship does seem to be the case for at least some locations;

2) in relatively free-flowing, i.e. non-congested conditions, the speed of traffic in each lane is directly related to the total traffic flow, e.g. the relationship illustrated in FIG. 4b holds true;

3) the vehicles in each lane may have an average separation determined by the traffic density (which can be calculated based on the flow in each lane and the average speed), although the separation of two adjacent vehicles can vary up to a specified minimum separation (due to tailgating etc);

4) the behaviour of the parameters of the traffic model discussed above (as functions of total flow) don't vary considerably over time for non-congested conditions, e.g. the density of traffic in each lane may vary with total flow but will vary in the same way with flow over time.

The traffic model may thus be used to calculate the probability that a vehicle in a particular lane will be not masked (and thus possibly detectable) as a function of the total traffic flow on the carriageway. In other words the traffic model may determine a value for $Obs_L$ for each lane of the road based on an estimate of the traffic flow. The probability of detection of a vehicle in the lane $PD_L$ may also be used to provide a factor related to the number of expected detections from each lane.

It can therefore be seen that the variables $F_L$ and $Obs_L$ of equation (1) are both related to traffic flow. The variable $PD_L$ could also be defined to have at least some variation with flow but it may be acceptable to define $PD_L$ as a constant for a given type of vehicle for a given section of road.

In some embodiments the data which is actually obtained from a DAS traffic sensor system for a section of road may be compared with a modelled performance of the system. This may be to assess the performance of the DAS traffic sensor system and/or to test the validity of the traffic model for the given section of road.

In such embodiments data about flow in each lane of the relevant section of road may be monitored using some reliable traffic flow sensor, i.e. the values $F_L$ for the various lanes could be directly measured by some other system (e.g. video detection or induction loops) that provides a high confidence flow value. This other traffic flow monitoring system may be temporarily deployed during a tuning/calibration phase of the DAS sensor. Data from the DAS sensor is also be detected and used to provide an actual detected DAS flow count, $F_D$.

Based on the traffic flow model a predicted DAS sensor count $F_{D\_predict}$ based on the actual detected flow may be determined. This provides an indication of the number of vehicles per unit time that would ideally be expected which may be compared to the number of vehicles that were actually detected by the DAS sensor in practice under a range of different flow conditions. This may be of use in tuning the DAS sensor during installation to provide optimal performance and/or may allow the model parameters to be refined if necessary so that the model provides an accurate representation of the relationship.

Figure 6:
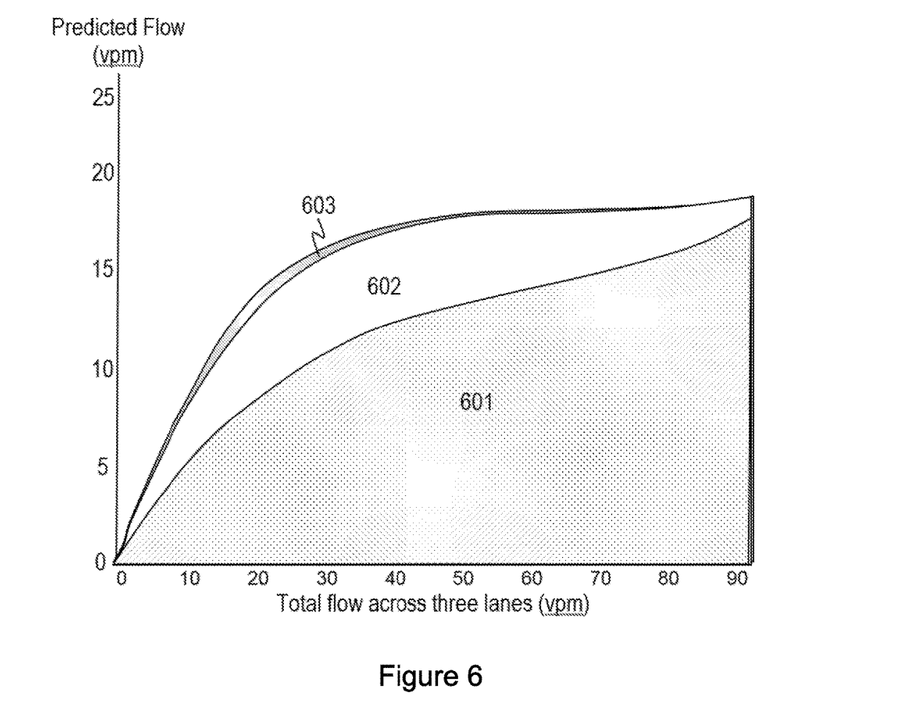
FIG. 6 illustrates one example of a mapping of true flow to predicted flow.

FIG. 6 illustrates one example of how measured flow across three lanes of a three lane road may map to the flow predicted to be detected in such conditions. Area 601 of the plot shows predicted flow detection for lane 1, area 602 corresponds to the predicted flow detection for lane 2 and area 603 corresponds to the predicted flow detection for lane 3. It can be seen that at relatively low flow rates most vehicles will be in lane 1 or possibly lane 2 and the DAS sensor would be predicated to detect a significant number of these vehicles. At relatively high flow rates however it would expected that the flow in lane 1 would mask detection of all but a few vehicles travelling in lane 2. At intermediate flow rates there may be a distribution of vehicles across the lanes but the distributed sensing would mainly detect vehicles in lane 1 or lane 2 and few detections from lane 3 would be predicted.

In some embodiments, possibly after the model has been validated as being sufficiently accurate, the model may be used in practice to refine the data collected by the DAS sensor in use.

The DAS sensor may thus be used to detect traffic flow for the monitored section of road. The acoustic signals may be analysed by processor 105 as discussed above to apply tracking algorithms to the data to detect individual vehicles. The processor may thus derive a detected flow value $F_D$. The DAS sensor may also determine the average speed and the spread of speeds of the detected vehicles and also, in some instances, may categorise the vehicles into at least two categories, such as heavy goods vehicle or other.

The processor 105 may then use the traffic flow model to determine estimates of one or more true flow properties, for instance an estimate of a true flow value.

The detected flow value $F_D$ and in some instances data such as the average vehicle speed and/or the detected spread of speeds and/or proportion of vehicles in each category may be used to determine the likely flow conditions. Effectively the model is used in reverse to what was just described previously so as to determine the flow conditions that would provide, given the probability of detection and expected masking for those flow conditions, the best fit to the actual data detected and thus an indication of the true flow in each lane.

From this an estimate of the true flow value, including the missed detections, may be determined. Additionally the average speed value may be revised to provide an estimate of true average speed. It will be appreciated that due to the masking effect and also the increased probability of detection, the DAS sensor will preferentially detect vehicles in the lane closest to sensing fibre. Thus the contribution from this lane may be given a greater weighting to the overall average than should be the case. In addition the bias towards detection of HGVs can be derived from the respective probability of detection values. By using the traffic model an estimate of the true flow conditions can be obtained and have an estimate of the true average speed.

The methods as described above will thus allow the prediction of the number of vehicles which would optimally be detected by the DAS system during different traffic conditions. As mentioned this may be used as part of a repeatable method for tuning the system for optimal performance during the installation phase. In this case, the flow parameters and probability of detection values will be gathered along with the DAS sensor data for a particular location and time period. The DAS flow detection algorithm parameters will be then altered iteratively to achieve the output which best matches that predicted by the model for the given dataset, according to the given performance metric. In addition, quantitative performance metrics can be set based upon these predictions, which can be used as a criteria for a new DAS installation to show the system is performing as well as could be expected.

The bias of the system outputs (average speed, journey times) towards certain lanes and vehicle types can be calculated and corrected for if necessary. This will improve the overall accuracy of the system outputs.

The methods also allow the flow data detected by the DAS system to be used to provide an estimate of the true total flow. The total flow is known to be key metric (along with average speed/journey time) used by various infrastructure management organisation in analysing traffic patterns and planning road closures and future improvements to the network.

The traffic flow data could be used with queue and congestion detection algorithms to provide the ability of detecting incidents occurring in certain situations, for example a queue building up at a location where the fibre sensitivity is low. This could be achieved by monitoring for changes in overall flow over sections between neighbouring junctions.

In general therefore in some embodiments of the invention a DAS traffic sensor system may determine one or more flow properties by determining the number of distinct acoustic signals corresponding to a vehicle that can be detected. One flow property may be a detected count of the number of vehicles travelling on that section of road. This detected count (or flow value if expressed in a count per unit time) is an actual measured count or flow value. Additionally or alternatively the flow property may be an indication of average speed and/or spread of speeds based on the detected vehicle tracks. The method may also involve determining traffic conditions and determining at least one factor related to missed detections. The at least one factor related to missed detections may comprise an indication of the general probability of a detection of a vehicle travelling in a particular lane of the road and/or of the likelihood that detection of a vehicle is masked by another vehicle. The traffic conditions may include the actual detected traffic flow or count and/or data related to the average vehicle speed and/or spread of vehicle speeds and/or the separation between distinct vehicle detections. The detected flow value may then be adjusted based on the at least one factor related to missed detections to provide an estimate of true flow value, e.g. the true count of vehicles passing per unit time.

Figure 5:
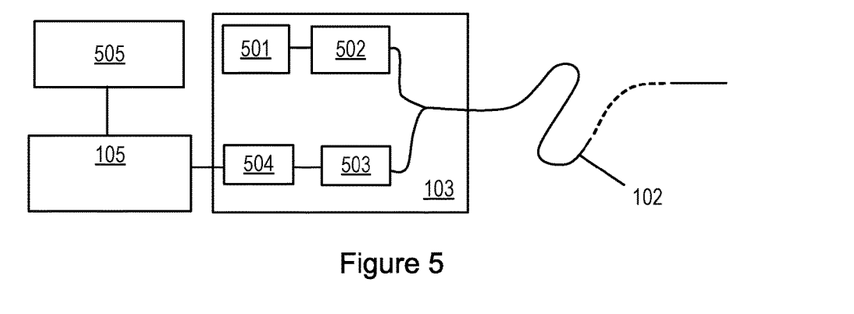
FIG. 5 illustrates a DAS sensor.

FIG. 5 shows a schematic of a conventional distributed fibre optic sensing arrangement 500. As discussed the sensing fibre 102 is optically coupled at one end to the interrogator unit 103, either directly through some suitable removable connection or in some instance indirectly, e.g. via an intermediate fibre or the like. The output from the interrogator unit 103 is passed to the processor 105, which may be co-located with, or form part of, the interrogator or may be remote therefrom, and optionally a user interface/graphical display 504, which in practice may be realised by an appropriately specified PC. The user interface may be co-located with the signal processor or may be remote therefrom.

As mentioned the sensing fibre 102 can be many kilometers in length and can be, for instance 40 km or more in length. The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the fibre may comprise a fibre which has been fabricated or arranged to be especially sensitive to incident vibrations.

In operation the interrogator unit 103 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto, although DAS sensors relying on a single interrogating pulse are also known and may be used. Note that as used herein the term "optical" is not restricted to the visible spectrum and optical radiation includes infrared radiation and ultraviolet radiation. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator unit therefore conveniently comprises at least one laser 501 and at least one optical modulator 502 for producing a plurality of optical pulses separated by a known optical frequency difference. The interrogator also comprises at least one photodetector 503 arranged to detect radiation which is Rayleigh backscattered from the intrinsic scattering sites within the fibre 102. A Rayleigh backscatter DAS sensor is very useful in embodiments of the present invention but systems based on Brillouin or Raman scattering are also known and could be used in embodiments of the invention.

The signal from the photodetector is processed by signal processor 504. The signal processor conveniently demodulates the returned signal based on the frequency difference between the optical pulses, for example as described in GB2,442,745. The signal processor may also apply a phase unwrap algorithm as described in GB2,442,745. The phase of the backscattered light from various sections of the optical fibre can therefore be monitored. Any changes in the effective optical path length within a given section of fibre, such as would be due to incident pressure waves causing strain on the fibre, can therefore be detected.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m, which for a continuous length of fibre of the order of 40 km say provides 4000 independent acoustic channels or so deployed along the 40 km of fibre. More channels could be arranged on a fibre with a different channel width.

It should be noted that the above-mentioned embodiments illustrate rather than limit the invention, and that those skilled in the art will be able to design many alternative embodiments without departing from the scope of the appended claims. Features from various embodiments may be combined and used together except where expressly indicated otherwise. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method for determining traffic flow, the method comprising:
    performing, by a distributed acoustic sensing interrogator unit, distributed acoustic sensing repeatedly to provide a measurement signal from each of a plurality of sensing portions of a first length of a sensing optical fibre, wherein the first length of the sensing optical fibre runs alongside a road having a plurality of lanes;
    processing, by a processor connected to the distributed acoustic sensing interrogator unit, the measurement signals repeatedly from said sensing portions to detect vehicles travelling on the road and determine at least one detected traffic flow property;
    using a traffic flow model, by the processor, to relate the at least one detected flow property to a modelled flow property, the traffic flow model modelling vehicle detections that will be missed by the distributed acoustic sensing; and
    outputting, by the processor, an estimate of traffic flow on the road based on the modelled flow property.

2. The method as claimed in claim 1 wherein the traffic flow model comprises an observation probability, the observation probability being the likelihood that detection of a vehicle in one lane will or will not be acoustically masked by a vehicle in a different lane which is closer to the sensing optical fibre.

3. The method as claimed in claim 2 wherein observation probability is determined based on traffic flow conditions.

4. The method as claimed in claim 3 wherein the first and second functions are based on historic flow data.

5. The method as claimed in claim 2 wherein the observation probability for a lane is determined based on an average vehicle spacing in lanes closer to the sensing optical fibre, wherein the average vehicle spacing in a lane is determined according to a first function relating average speed in said lane to total traffic flow and a second function relating traffic lane in said lane to lane to total traffic flow.

6. The method as claimed in claim 2 wherein the observation probability for a lane is determined based on a masking window associated with a vehicles in a lane to the sensing optical fibre.

7. The method as claimed in claim 6 wherein different vehicles are classified into different categories, wherein each category is associated with a masking window of different size.

8. The method as claimed in claim 7 wherein the traffic flow model determines for at least one lane a proportion of vehicles of each category.

9. The method as claimed in claim 2 wherein the traffic flow model comprises a detection probability, the detection probability being the likelihood that a vehicle in a given lane which is not acoustically masked will or will not be detected by the distributed acoustic sensing.

10. The method as claimed in claim 9 wherein the detection probability is based on test data obtained by driving a test vehicle in the along the relevant section of road in the relevant lane at times of low traffic volume.

11. The method as claimed in claim 1 wherein the at least one detected traffic flow property comprises at least one of: a total detected flow value; a detected average vehicle speed and a detected spread of vehicle speeds.

12. The method as claimed in claim 1 further comprising:
    monitoring traffic flow using a second different traffic monitoring system; wherein using the traffic flow model to relate the at least one detected flow property to the modelled flow property comprises:
    deriving a predicted value of the flow property as said modelled flow property based on the monitored traffic flow and the traffic flow model; and comparing the predicted and detected flow property.

13. The method as claimed in claim 12 wherein the second different traffic monitoring system comprises a video based traffic monitoring system.

14. The method as claimed in claim 12 wherein the method comprises revising one or more parameters of the traffic flow model based on said comparison.

15. The method as claimed in claim 1 wherein using the traffic flow model to relate the detected flow property to the modelled flow property comprises:
    using the traffic flow model to provide an estimate of a true value of the flow property as said modelled flow property based on the at least one detected flow property, wherein the estimate of the true value of the flow property compensates for missed detections.

16. The method as claimed in claim 15 wherein the method comprises estimating flow conditions based on at least one of: a detected traffic flow value, a detected average traffic speed, a spread of detected traffic speed, wherein the traffic flow model derives the estimate of a true value of the flow property based on the detected flow property and the estimated flow conditions.

17. An apparatus for determining traffic flow, the apparatus being configured to:
    receive, by a distributed acoustic sensing interrogator unit, a first data set corresponding to distributed acoustic sensing measurement signals from each of a plurality of sensing portions of a first length of a sensing optical fibre, wherein the first length of the sensing optical fibre runs alongside a road having a plurality of lanes;

process, by a processor connected to the distributed acoustic sensing interrogator unit, the measurement signals repeatedly from said sensing portions to detect vehicles travelling on the road and determine at least one detected traffic flow property; and using a traffic flow model, by the processor, to relate the at least one detected flow property to a modelled flow property, the traffic flow model modelling vehicle detections that will be missed by the distributed acoustic sensing, and wherein the apparatus outputs an estimate of traffic flow on the road based on the modelled flow property.

18. The apparatus as claimed in claim 17 further comprising said first length of sensing optical fibre and the distributed acoustic sensing interrogator unit interrogates said first length of sensing optical fibre to obtain set first data set.

19. A traffic management system comprising the apparatus for determining traffic flow as claimed in claim 17 provides an estimate of traffic flow and a controller for generating a control signal for controlling at least one road signal based on said estimate of traffic flow.

20. The apparatus of claim 17 further including a controller for generating a control signal for controlling at least one road signal based on the estimate of traffic flow.

21. A method of assessing a distributed acoustic sensor traffic monitoring system having a sensing optical fibre deployed to run alongside a first section of road with multiple lanes, the method comprising:

monitoring traffic flow repeatedly over the first section of road using the distributed acoustic sensor (DAS) traffic monitoring system to provide a DAS detection value;

monitoring traffic flow over at least part of the first section of road using a second different type of traffic monitoring system repeatedly to provide an indication of vehicle flow;

applying, by a processor, a traffic flow model to the indication of vehicle flow to provide an estimate of an expected DAS detection value, the traffic flow model modelling vehicle detections that will be missed by the distributed acoustic sensor traffic monitoring system; and outputting an estimate of traffic flow on the road based on the modelled flow properly and the DAS detection value.

* * * * *